United States Patent [19]

Lunsford et al.

[11] 4,079,456
[45] Mar. 14, 1978

[54] OUTPUT BUFFER SYNCHRONIZING CIRCUIT HAVING SELECTIVELY VARIABLE DELAY MEANS

[75] Inventors: John Albert Lunsford, Willingboro; Lloyd William Martinson, Haddonfield, both of N.J.

[73] Assignee: RCA Corporation, New York, N.Y.

[21] Appl. No.: 762,098

[22] Filed: Jan. 24, 1977

[51] Int. Cl.² ............................. G06F 1/04; G06F 3/00
[52] U.S. Cl. .................................................... 364/200
[58] Field of Search ............................. 364/200, 900

[56] References Cited

U.S. PATENT DOCUMENTS 3,516,074   6/1970   Enomoto .......................... 364/900
4,021,784   5/1977   Kimlinger ......................... 364/200

Primary Examiner—James D. Thomas
Attorney, Agent, or Firm—H. Christoffersen; Samuel Cohen; Carl M. Wright

[57] ABSTRACT

Output buffer synchronizing circuit having selectively variable delay means to compensate for different output delays of a processor when the latter operates in different modes. A buffer clock is not only synchronized with the processor clock but also switched in frequency only when in proper phase therewith by delaying a reference signal by $kT_R/N$, where N is the ratio of the reference period to the processor clock period, $T_R$ is the reference period, and $k$ is a selectable integer such that $0 \leq k - N \leq 1$.

6 Claims, 10 Drawing Figures

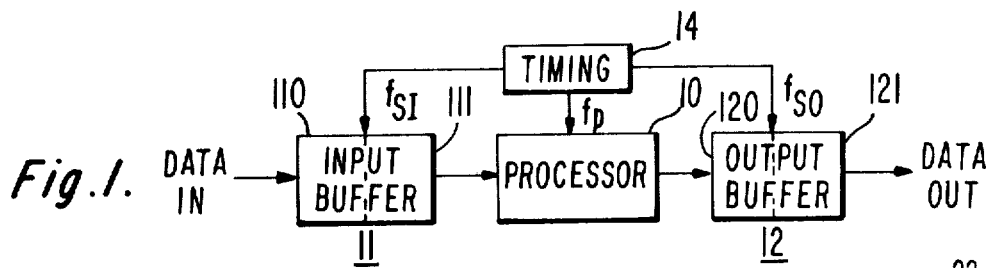
Fig. 1.
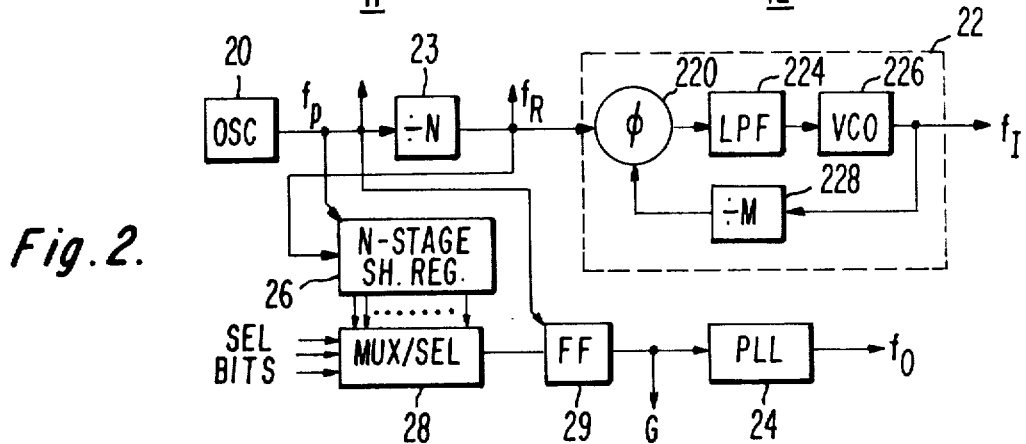
Fig. 2.
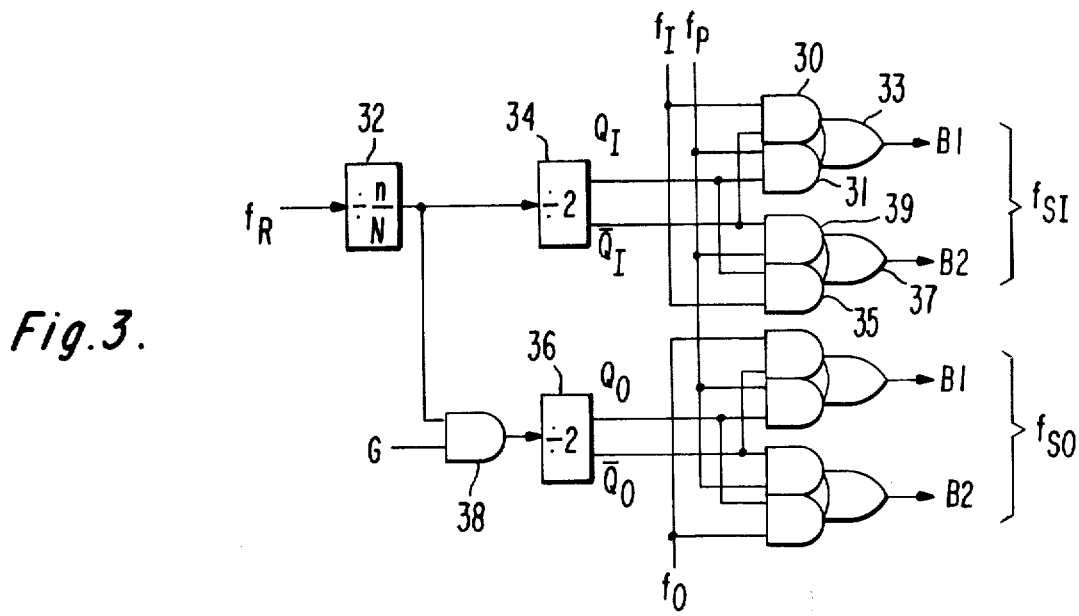
Fig. 3.
Fig. 4a.
Fig. 4b.
Fig. 4c.
Fig. 4d.
Fig. 4e.
Fig. 4f.
Fig. 4g.
Fig. 4.

OUTPUT BUFFER SYNCHRONIZING CIRCUIT HAVING SELECTIVELY VARIABLE DELAY MEANS

The Government of the United States has rights in this invention pursuant to Contract No. F33615-74-C-1077 awarded by the Department of the Air Force.

This invention relates generally to clock synchronizers and particularly to synchronization of buffer clocks and those of associated processing units.

Sample data is usually collected at a rate different from that at which it is processed. The sample data is accumulated in some type of input buffer and processed therefrom by a processor with the results being temporarily stored in an output buffer. The output buffer data transfer rate is usually the same as the input buffer data transfer rate. The buffers therefore operate at one rate while collecting (and outputting) data and at a different rate while transferring data to or accepting data from an associated processor. The switching from one buffer clock rate to the other — herein referred to as switching clocks — must occur when the processor and buffer clocks are exactly in phase.

Although there are constraints in any such system, the implementation of clock synchronizing circuits is straightforward in those systems where the processor operates in one mode (hence with constant delays) at all times. When the processor, especially a pipeline processor, can operate in any one of several modes, each mode employing a different number of stages — with resulting different delay intervals — between the input and output terminals, it is necessary to vary the synchronization and switching of the output buffer clock to compensate for the processor delays. Otherwise, output data will be lost.

One solution to this problem has been to provide switchable delays at the processor's output interface, each delay being equal to a stage delay of the processor so that by selectively switching in delays ad seriatum in certain modes, the total delay through the processor is kept constant. One disadvantage of such a system is that the faster processing speed of the shorter pipelines is slowed by having to provide the additional delays. It is also expensive.

A system embodying the invention includes processor means, processor clock means for supplying clock signals at the processor rate, input clock means for supplying clock signals at a data rate, input data buffer means having first and second sections to store the sample data in one section at the input clock rate and to supply data to the processor from the other section at the processor rate, output clock means for supplying clock signals at the data rate, output buffer means having first and second sections to store data signals from the processor in one section at the processor clock rate and to produce output signals from the other section at the data rate. There is a circuit for synchronizing and switching the input and output clock means including a divider means for providing a reference signal having a period N times the processor clock period, means for coupling the reference signal to the input clock means, and a variable delay means for delaying the reference signal to the output clock means by a delay period $kT_R/N$, where $T_R$ is the period of the processor clock signal, and $k$ is a selectable integer between 0 and N-1.

In the drawings:

FIG. 1 is a block diagram of a system in which the invention is useful;

FIG. 2 is a block diagram of an embodiment of the invention;

FIG. 3 is a logic diagram of a clock switching circuit; and

FIG. 4, comprising FIGS. 4a – 4g, is a timing diagram depicting idealized signal waveforms at certain points in a circuit according to FIG. 2.

In real-time, pipeline digital signal processors where the sampling frequency is different from the processing frequency, a buffer memory or register is required at the input and output ports of the processor to store blocks of data collected for processing or for interfacing processed data with output devices while other blocks of data are being processed. It is necessary to switch between sample clocks and processing clocks in these buffers because the processing rate is different from the sampling rate. The clocks must be switched only when the sample and process clocks are exactly in phase. There are additional problems at the processor's output side because the processor may not contain the proper number of delays in its pipeline for the process and sample clocks to be in phase at exactly the desired switching time, especially if the processor has a different pipeline length for different modes of operation. The block diagram of such a system is shown in FIG. 1. A processor 10 receives data from an input buffer 11 and transfers output data to an output buffer 12. The timing control for each of the devices is accomplished by a timing network 14, which supplies the signals $f_{SI}$, $f_{SO}$, and $f_P$.

The details of the timing circuitry, i.e., the circuits within block 14, are shown in FIGS. 2 and 3. In the following explanation of the illustrated embodiment and of the operation of the invention, it will be presumed that both buffers are divided into two sections. For example, the input buffer 11 is divided into the sections 110 and 111, and the output buffer, into the sections 120 and 121. The two sections of each buffer are also referred to as B1 and B2 herein. One section of the input buffer provides data to the processor at the processor rate, i.e., at the frequency of the processor clock, and the other section accepts sampled data at a data rate. Similarly, one section of the output buffer accepts data from the processor at the processor rate and the other section reads out data at the data rate. The relationship between the data (sampling) rate and the processor rate is given by $$f_S = (M/N)f_P$$

where $f_S$ = data rate (frequency), $f_P$ = the processor rate (frequency) and $M/N$ = the ratio of the data to processor rates.

The processor is presumed to be a pipeline processor, such as a pipeline FFT, having several stages. An example of a floating point stage is shown in U.S. Pat. No. 3,800,130 (L. W. Martinson & R. J. Smith), assigned to the same assignee as this application. Furthermore, for purposes of illustration, the processor frequency will be presumed to be 10 MHz and the data frequency to be 8.75 MHz. Therefore, M is 7 and N is 8.

In the circuit shown in FIG. 2 (which is within block 14 of FIG. 1), an oscillator 20 generates clock signals at the processor frequency, $f_P$. The input clock signals $f_I$ at the data frequency are generated by a phase-locked loop 22, enclosed in dashed lines. Similarly, the output clock signals $f_O$ at the data frequency are generated by a phase-locked-loop 24.

The operation of a phase-locked loop is well known in the art; only a summary follows. A reference frequency and a frequency derived from the output frequency of the phase-locked loop are compared by a phase-comparator 220. The phase difference signal is filtered through a low-pass filter 224 to produce a control voltage coupled to a voltage-controlled oscillator (VCO) 226 which generates the output signal. In the present circuit, the output signal is divided by a divider 228 whose output signal is coupled to the phase comparator 220. The frequency division by M in the divider 228 locks the frequency of the VCO 226 to exactly M times the reference frequency coupled to the phase comparator 220. Any drift in the VCO frequency causes the phase difference signal from the phase comparator 220 to change in a direction that alters the VCO frequency in a direction to counteract the drift. Since the reference frequency, $f_P$, is the processor frequency, $f_P$, divided by N, the output signal frequency from the phase-locked loop 22 is M/N times the processor frequency from the oscillator 20.

The reference frequency $f_R$ applied to the phase locked loop 24, which furnishes the data rate clock to the output buffer, is delayed by a network including an N-stage shift register 26, a multiplexer/selector 28, and a flip-flop 29.

The multiplexer/selector 28 receives an output signal from each of the N stages of the shift register 26. It also receives a number of selection bit signals which are decoded internally to couple a designated one of the N register output signals as the output signal from the multiplexer/selector 28. A total of $b$ selection bits can designate $2^b$ unique combinations so that $b \geq \log_2 N$. A commercially available multiplexer/selector 28, which can be used where N equals eight, is an integrated circuit device SN74151 (Texas Instruments, Inc.). The shift register 26 can be implemented with an integrated circuit device SN74164 (Texas Instruments, Inc.) for N equals eight. The serial input to the shift register 26 is the reference frequency, $f_R$, derived from the processor frequency, $f_P$, of the oscillator 20 by dividing by N in the divider 23. The shift signal is the oscillator output signal so that a reference frequency signal is shifted from stage to stage in the shift register 26 at the processor frequency.

In FIG. 4, FIG. 4(a) is a representation of the output signal from the oscillator 20. FIG. 4(b) is a representation of the reference frequency at the output side of the divider 23 for N equals eight and the leading edge of these pulses defines the in-phase point of the clocks. If the selector bits, which in this example total three binary digits, represent a value of zero, then the output signal from the multiplexer/selector 28 would be the reference frequency as shown in FIG. 4(b). More precisely, it would be the signal from the last stage of the shift register 26 because the number of stages in the shift register 26 is equal to the divisor value of the divider 23. (It is clear that the shift register could be used only N−1 stages, the $f_R$ signal replacing the signal from the Nth stage since these two signals are always in phase.) If the selector bits designate a value of one, the output signal from the multiplexer/selector 28 would be as shown in FIG. 4(c), i.e., the reference frequency delayed by one period of the processor frequency. Similarly, FIG. 4(d) corresponds to a selector value of two and a delay of two periods of the processor frequency, FIG. 4(e), to a value of three, and so on. For a selector value of seven (not shown), the delay is the maximum of seven periods of the processor frequency. If the value of the selector bits is designated generally by an integer $k$, the delay introduced by the shift register 26 and multiplexer/selector 28 can be represented by $kT_R/N$ since $T_R/N$ is the period of the reference frequency $f_R$ divided by N, which equals a period of the processor frequency. A flip-flop 29 (FIG. 2) is used as a reclocking device. That is, in order to insure that the reference signal $f_R$ to the phase-locked loop 24 is exactly in phase with the processor frequency, $f_P$, the output signal from the multiplexer/selector 28 is set into the flip-flop 29 by the output signal from the oscillator 20. The flip-flop 29 can be simply a D-type flip-flop such as used in integrated circuit type device SN7474 (Texas Instruments, Inc.).

The selector bits to the selector 28 can be supplied from manually set switches or electronically controlled gates. They would be set to values related to the number of stages by which the output signal from the processor lags the input signals thereto. Thus, by setting the selector switch to the desired value of $k$, the reference signal to the phase comparator in the phase-locked loop 24 is delayed by exactly the amount required to synchronize the processor operation to the output buffer.

The circuit for switching the processor frequency or the data frequency to the buffers is shown in FIG. 3. This circuit is also within 14 of FIG. 1 and receives the two output signals $f_I$ and $f_O$, the reference frequency $f_R$, and the processor frequency $f_P$, produced by the circuit of FIG. 2. Letting $n$ represent the number of samples processed in a block, i.e., that are stored in each section of the buffers, a divider circuit 32 dividing the reference frequency $f_R$ by a value n/N produces a signal when the buffer clocks are to be switched. It should be noted that $n$ represents the number of samples used by the processor in one block of data to be processed. If the data frequency is lower than the processor frequency, then fewer samples will be collected than are processed which indicates that some samples are used more than once. If the information is sampled at a higher rate than the processing rate, then some samples are not used. Each time a block of samples is to be processed, a divide-by-two circuit 34, which can be a triggerable flip-flop, changes state. In one state, its set output signal, $Q_I$, primes an AND gate 31 which is enabled by the processor frequency signal, $f_P$, from the oscillator 20 (FIG. 2) to run the first section of the buffer (B1) at the processor frequency through an OR gate 33. The set output signal, $Q_I$, also primes an AND gate 35 which couples the signal $f_I$ from the phase-locked loop 22 (FIG. 2) to the second section of the input buffer (B2) via an OR gate 37. When the block has been processed, the divide-by-two device 34 is triggered to its opposite state so that its reset output signal, $\overline{Q}_I$, primes an AND gate 39 which couples the processor frequency signal, $f_P$, from the oscillator 20 (FIG. 2) to the second section of the buffer (B2) through the OR gate 37 and also primes an AND gate 30 to couple the data frequency $f_I$, to the first section of the buffer (B1) through the OR gate 33. In a similar manner, the output signal $f_O$ from the phase-locked loop 24 (FIG. 2) is coupled to one section of the output buffer while the other section is coupled to the processor frequency $f_P$ from the oscillator 20 (FIG. 2) depending on the state of the divide-by-two device 36. The change of state of the divide-by-two device 36, however, must be delayed until the output buffer has accepted all of the samples from the processor. This delay is accomplished by changing the state of the divide-by-two device 36 with the output signal (G) from the flip-flop 29 (FIG. 2) through an AND gate 38. This insures that the output buffer clocks are switched while the clocks are exactly in phase at the proper time.

What is claimed is:

1. In a system including processor means, processor clock means for supplying clock signals at a processor rate, input clock means for supplying clock signals at a data rate, input data buffer means having a first section and a second section for storing sample data signals in one section in response to said input clock signals and supplying input data signals to said processor means from the other section in response to said processor clock signals, output clock means for supplying clock signals at the data rate, output buffer means having a first section and second section for storing data signals from said processor in one section in response to said processor clock signals and producing output signals from the other section in response to said output clock signals, a circuit for switching said input and output data rate clock means and for synchronizing said input and output data rate clock means with said processor clock means comprising, in combination:

divider means responsive to said processor clock means for dividing the frequency of said processor clock signals by N to supply reference clock signals;

means for coupling said reference clock signals to said input clock means; and delay means for coupling said reference clock signals to said output clock means, said delay means including means for selectively delaying said reference clock signals by $kT_R/N$ where $T_R$ is the period of said reference clock signals and k is a value such that $0 \leq k - N \leq 1$.

2. The invention as claimed in claim 1 wherein said delay means includes shift register means having at least $N-1$ stages for receiving and shifting from stage to stage said reference signals in response to said processor clock signals, and selecting means responsive to said shift register means for coupling a signal from one of said stages to said output clock means.

3. The invention as claimed in claim 2 wherein said selecting means includes means for receiving signals representative of the value of $k$; and multiplexer/selector means having as input signals the output signal of each of the stages of said shift register means and said reference clock signals, responsive to said signal representative of the value of $k$ for producing as an output signal the input signal designated by the value of $k$.

4. The invention as claimed in claim 2 further comprising reclocking means responsive to said processor clock signals for coupling signals from said delay means to said output clock means.

5. The invention as claimed in claim 4 wherein said reclock means includes flip-flop means.

6. The invention as claimed in claim 2 further comprising sample timing means responsive to said processor clock for producing a framing signal;

means responsive to said framing signal for producing a first group of enabling signals;

means responsive to said framing signal and said delay means for producing a second group of enabling signals;

first gating means responsive to said first group of enabling signals for coupling said processor clock signals and said input clock signals to said first and second section of said input buffer means; and second gating means responsive to said second group of enabling signals for coupling said processor clock signals and said output clock signals to said first and second sections of said output buffer means.

* * * * *

UNITED STATES PATENT OFFICE
CERTIFICATE OF CORRECTION

PATENT NO. : 4,079,456

DATED : March 14, 1978

INVENTOR(S) : John Albert Lunsford et al.

It is certified that error appears in the above-identified patent and that said Letters Patent are hereby corrected as shown below:

Column 3, line 18, "$f_P$" (first occurrence) should be --$f_R$--.

Signed and Sealed this

Eighteenth Day of July 1978

[SEAL]

Attest:

RUTH C. MASON
*Attesting Officer*

DONALD W. BANNER
*Commissioner of Patents and Trademarks*